INVENTOR.
NELSON C. CAHOON

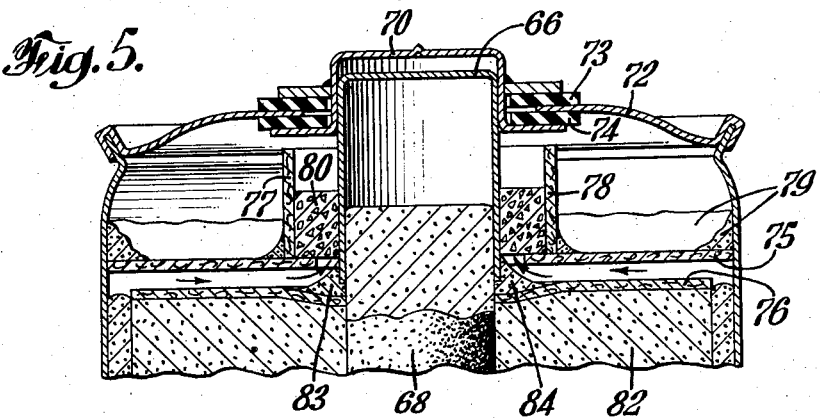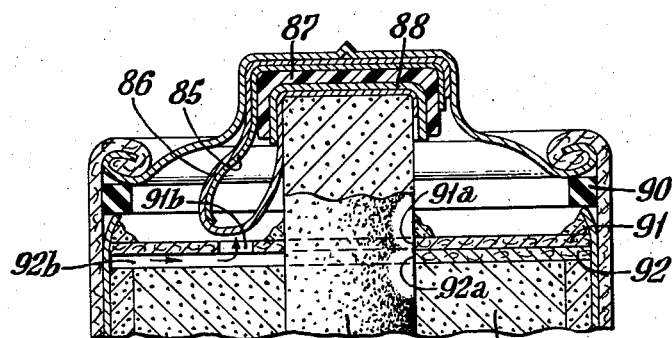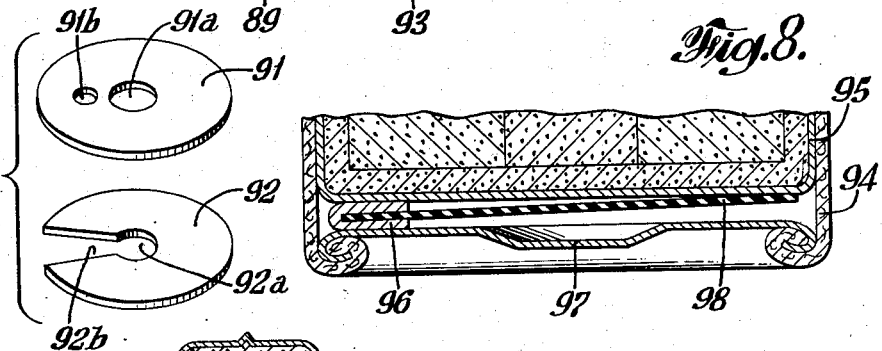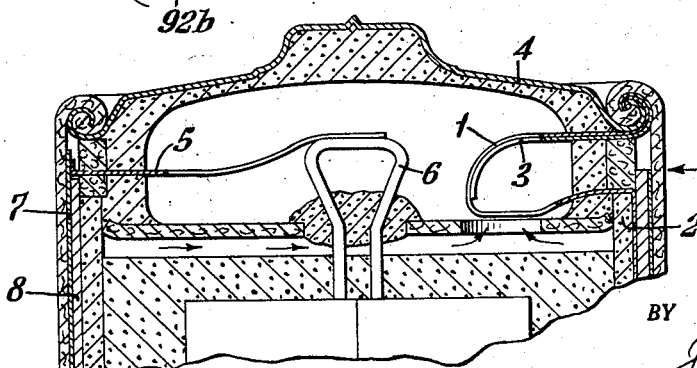
March 3, 1959 — N. C. CAHOON — 2,876,271
ELECTROLYTIC FUSE
Filed Feb. 20, 1956 — 2 Sheets-Sheet 2
INVENTOR
NELSON C. CAHOON

United States Patent Office 2,876,271
Patented Mar. 3, 1959

2,876,271

ELECTROLYTIC FUSE

Nelson C. Cahoon, Fairview Park, Ohio, assignor to Union Carbide Corporation, a corporation of New York Application February 20, 1956, Serial No. 566,541

11 Claims. (Cl. 136—135)

This invention relates to dry cells, and has for its chief object a fuse for the prevention of dry cell leakage.

Dry cell leakage is caused primarily by gas pressure generated within the cell and accompanying excessive build-up of exudate during use. In certain instances, this exudate may be forced through the cell container or through the joints of its component parts. Obviously in order to maintain satisfactory functioning of a dry cell, it is mandatory to keep both electrolyte and exudate confined within the cell container. Failure to do so produces one or more of the following detrimental consequences. For one, where the electrolyte has perforated its container electrode, it is able then to corrode the cell-containing equipment, with expensive results. For another, where electrolyte has crept along the joints between either or both electrodes and the cell cap or cover member, the effectiveness of the cell is reduced. Naturally, both of these consequences are aggravated where one or more cells of a battery leak, since one leaking cell can short-circuit several properly functioning cells.

Various expedients have been suggested and tried in order to prevent or overcome the above-outlined cell leakage problem. Hitherto all these have been based generally on the provision of an annular or otherwise shaped receptacle into which the electrolyte exudate may pass from the cell when forced out by gas pressure, the cell being closed at its top in such a way as to direct this leakage to the receptacle.

In contrast to the above approach, the present invention solves the leakage problem without necessitating the placing of the cell in any special receptacle. Essentially, the invention is based on the concept of utilizing a strip of easily attacked material or "fuse" in series between an electrode and its external terminal, which strip is broken upon contact with cell exudate, thereby disconnecting electrical circuit and terminating cell activity. The fuse of the invention thus permits customary current production under normal conditions, but breaks the cell circuit when contacted by cell exudate.

In the practice of the invention the actual breaking of the circuit may result from chemical or electro-chemical action upon the fuse, or may result from a combination of both factors. Chemical action upon the fuse results from the corrodable nature of the material from which the fuse is composed. Electro-chemical attack depends on the short circuiting of the fuse when the same acts as the anodic component of a separate cell system. In the Le Clanche cell, such a system can be represented by the relationship $$MnO_2/ZnCl_2-NH_4Cl/fuse$$

Obviously a great many variations in construction embodying the above-outlined principles underlying electrolytic fuse operation are possible. The following drawings present only those designs which most effectively illustrate these principles, and are not in any way intended to limit the scope of the invention as regards structural configuration or current-producing systems.

In the drawings:

Fig. 5 is a variant of the invention showing the critical positioning of accelerator salt units with respect to the cell fuse.

Fig. 6 shows a variant of the invention operating by both chemical and electro-chemical action, but in which the fuse is fitted with a spring for a more rapid action.

Fig. 7 is a perspective view of a washer construction providing a constricted path to guide the exudate to the fuse.

Fig. 8 is a fragmentary view in cross-section illustrating a version of the invention wherein the fuse is in contact with the negative terminal of the cell.

Fig. 9 is a fragmentary view in cross-section showing an external cathode cell fitted with an electrolytic fuse.

Generally, the fuse or fusible element of the present invention should have the following characteristics:

(1) It should be composed of a material easily affected by exudate corrosion. Such metals as zinc, aluminum, magnesium, etc., and alloys thereof admirably fit this requirement.

(2) This fuse material should have sufficient conductivity for normal cell use.

(3) Upon breaking, the fuse should introduce a minimum resistance of 15 ohms in the case of a flashlight cell.

(4) The fuse should have dimensions such as to easily rupture. For this reason, it may consist of foil, or may be in the form of a printed circuit.

(5) The break in the fuse should leave a long path not easily bridged by the electrolyte.

In practice, it is necessary to provide a rapid reaction between the fusible element or fuse and cell exudate. Several means for securing such action are disclosed hereafter.

Figure 1:
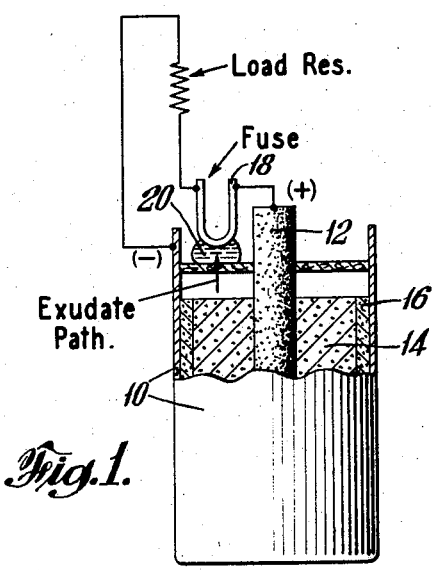
Fig. 1 is a vertical, cross-sectional, partly diagrammatic view of an electrolytic fuse interposed in a conventional dry cell circuit to operate by electro-chemical attack.

More specifically, Fig. 1 illustrates a typical dry cell having a zinc can 10, serving as its anode, a carbon electrode 12, a conventional electrolyte-wet cathode mix indicated by reference character 14, separated from the cathode by paste or other separator means 16. Interposed between the external terminal or brass cap (not shown) and the cathode 12 is a strip of zinc metal constituting the dry cell fuse 18. This fuse in effect is the anodic component of a separate cell system which may be represented as follows:

$$MnO_2/ZnCl_2-NH_4Cl/fuse$$

Under the conditions provided by the outlined circuit, the fuse is electro-chemically attacked by exudate, which may rise above normal mix level, as indicated in exaggerated form by reference character 20.

Where the dry cell fuse operates by electro-chemical action, it need not be composed of a metallic material having a greater electro-negativity than the dry cell anode. This conclusion obtains inasmuch as the voltage between the cathode and the dry cell fuse is higher than that between the cathode and the anode. Consequently, the dry cell fuse strip will be attacked by exudate in preference to the anode.

Figure 2:
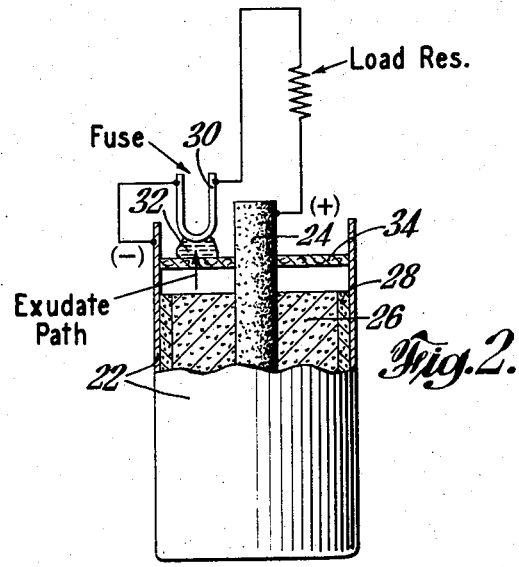
Fig. 2 is the same as Fig. 1 for a fuse circuit functioning by chemical attack.

Fig. 2 illustrates a variant of the invention actuated by chemical attack. Here a conventional dry cell having a container zinc anode 22, a carbon electrode 24, and an electrolyte-wet depolarizing mix composed of manganese dioxide (as in Fig. 1) 26, separated from the cathode by paste or other separator means 28, is fitted with an aluminum fuse strip 30 in series with the cell anode, and, eventually, with the load resistance (i. e., a bulb, in the case of flashlight cells).

From Fig. 2 and reference character 32 it is obvious that when exudate rises above normal mix level and by-passes washer 34, it then is able to attack, corrode and destroy the cell fuse, thereby breaking the circuit and stopping further cell discharge. The fuse-equipped cell then returns to equilibrium, leakage having been forestalled.

Figure 3:
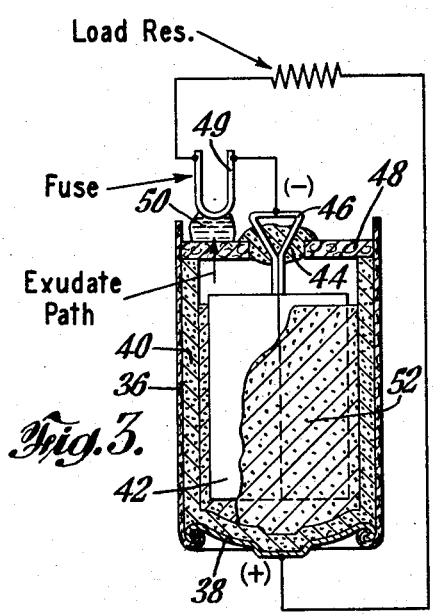
Figs. 4 and 3 are the same as 1 and 2 respectively, for an external cathode cell.
Figure 4:
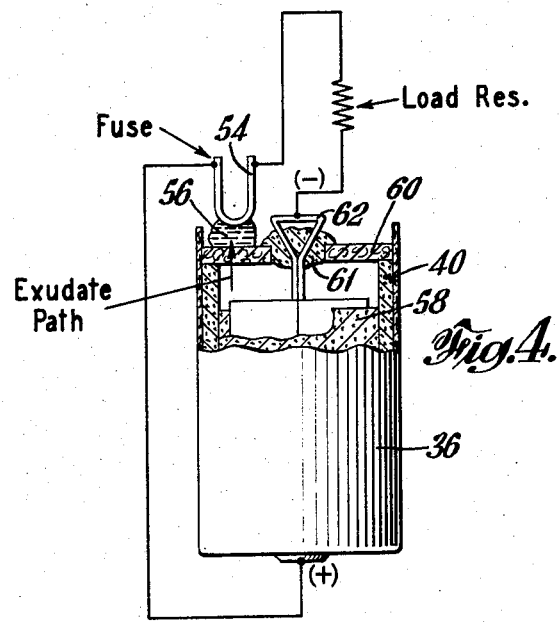

Illustrating the wide applicability of the present invention, Figs. 3 and 4 diagrammatically show an external cathode cell of the type disclosed and claimed in U. S. Patent 2,605,299, issued July 29, 1952, to Jean P. Teas.

In Fig. 3 such a cell comprising a paper tube 36 closed at one end by a metal cover 38, a carbon cathode 40, a stemmed zinc anode 42 centrally anchored within the tube by means of a wax engagement 44 of its stem 46 through the washer 48, is chemically protected against leakage by having an aluminum strip 49 between its anode and the external load resistance. Exudate 50 rising above the mix 52 will find its way through the path provided therefor to attack and rupture fuse 49.

A variant of the above cell functioning electro-chemically is shown on Fig. 4. Here a zinc strip 54 is interposed as shown in the internal cell circuit. Exudate 56 rising from the mix 58 is directed by a suitable path through washer 60, to which is anchored by means of wax 61, the anode stem 62.

While for the sake of simplicity the circuits contributing to chemical and electro-chemical attack upon the dry cell fuse of the invention have been shown separately, it is not to be assumed that the two principles of operation are entirely distinct in actual cell functioning. In other words, chemical attack upon the fuse element may partake of some electro-chemical features and vice versa.

Since to insure leak-proofness, cell action should be stopped as rapidly as possible, it is desirable to effect a rapid reaction between the fuse element and the cell exudate. To obtain such a rapid reaction, it has been found helpful to add to the air space of fuse-equipped cells, "accelerator" salts, sprinkled on top of the cell mix or in the form of pellets which will contact rising exudate. Acidic salts such as aluminum salts soluble in exudate may be used with other salts such as mercuric chloride. A suitable composition consists of two parts by weight of aluminum sulfate and five parts by weight of mercuric chloride. For flashlight cell purposes about 0.7 gram of such a mixture will suitably accelerate attack upon a given fuse element.

There is shown in Fig. 5 a tubular sleeve-like fuse 66 having dimensions such as to fit snugly over the top of the carbon electrode 68 in contact with the cell brass cap 70, but insulated from the metal cover 72 by insulating washers 73 and 74. A conductive path for the exudate (shown by arrows), to be described later in connection with Fig. 7, is formed by the combination of waxed paper collars or washers 75 and 76, separated as shown. Parts shown by reference characters 77 and 78 are the sections of a single cardboard tube surrounding the tubular fuse. This tube is supported by washer 75 to which it is anchored by means of circumferential wax seal 79. Accelerator salts pellet 80, having the composition above disclosed is maintained in place by the tube. In this manner exudate rising from the paste layer or mix is confined around the fuse by means of the tube, and chemical attack upon the fuse is accelerated by the dissolving salt previously positioned therein. As shown, washer 76 fits over the mix bobbin 82. Wax seals 83 and 84 aid in fixedly securing in place dry cell fuse 66.

Fig. 6 shows a modification of the invention in which mechanical means in the form of a metal spring accelerate circuit breaking. As indicated, a metal spring 85 presses against the dry cell fuse 86, which in this modification is borne on a combined plastic cell closure and fuse support 87. To insure electrical contact, a brass cap 88 is fitted over the top of carbon electrode 89. As shown, sufficient space is provided in the top washer 90 for the indicated spring action. A direct low resistance path to guide the exudate to the fuse is provided by top collars 91 and 92.

The version of the invention represented on Fig. 6 is particularly attractive for small hearing aid cells and the like, owing to its combined plastic cell closure and fuse support, which may be fabricated to small dimensions, and similarly conserving space.

Fig. 7 shows in detail collars 91 and 92, which provide a low resistance path for the exudate as previously mentioned in connection with Figs. 5 and 6. The first collar 92 preferably consists of a wax paper disk fitting the inside of the cell can, and having both a central aperture 92a to permit passage of the insoluble carbon electrode and a wide slot 92b cut from edge to center. As shown in Fig. 6, collar 92 is positioned directly on top of the mix bobbin 93. To complete the directive path, collar 91 is super-imposed over collar 92 and integrated with it, if desired. As shown, collar 91 has two apertures, one 91a to permit passage of the carbon electrode, and another 91b placed directly above the slot 92b of the lower collar 92, thus completing the exudate path.

The modification of the invention represented by Fig. 8 is suitable for jacketed cells, and provides for an electrolytic fuse in contact with the negative terminal of the cell. The cell structure furnishes a path for exudate to travel inside the jacket 94 and down along the outside of the zinc can 95, eventually to attack a fuse 96 positioned between the bottom of the can and the bottom disk closure 97. An insulating disk 98 separates the extremities of the fuse. For this specific embodiment a magnesium strip fuse has given best results.

In Fig. 9 appears an external cathode cell 99 fitted with the fuse of the invention. The modification there shown has a strip of zinc 1, 0.005 inch thick and 0.125 inch wide, contacting the injection molded cathode connector layer 2. A stainless steel spring 3 is spun into contact with the positive cover 4, and incorporated in the fuse assembly to insure positive separation of the fuse ends when attack upon the strip occurs. A metallic member 5 provides contact from the stemmed anode 6 to a foil 7 spun into contact with the negative cover 8.

The fuse structure also may consist of a conductive circuit printed, brushed or painted on a non-conductive support or surface.

Another obvious modification of the invention consists of a dry cell equipped with two electrolytic fuses. One of these, functioning by chemical attack thereagainst, contains a fuse composed of a metal of a higher electro-negativity than the cell anode. The other fuse, operating by electro-chemical action thereagainst, suitably may be composed of the same metal as the dry cell anode.

The cells of the invention readily pass usual service tests, so that the dry cell fuse incorporated in their design does not prevent users from obtaining the full normal service capacity conventional cells render.

Comparative tests conducted with currently commercially available D-size cells and with the "fused" cells of the type hereinabove described highlight the additional merits of the invention.

Thus a number of D-size, paste-type, fuse-equipped dry cells were subjected to eight different abuse tests of varying severity, and after a protracted period of time, exhibited neither external leakage or expansion of any sort. By contrast, commercially available leak-proof cells which depend upon special receptacles for their "leak-proofness" when subjected to the same tests, invariably showed leakage on one or more of these tests.

The above information, together with an identification of each test, appears in Table I, wherein cells denominated leak-proof cell "A," leak-proof cell "B" and leak-proof cell "C" are commercially available cells, differing only with respect to the type of leak-proof receptacle employed. Table I thus furnishes a comparison of the leak resistance of representative lots of various types of commercial dry cells. The numerals appearing in the table refer to the percentage of leaky cells at the time indicated at the top of the four columns. The notations (113° F.—50% R. H. and 95° F.—50% R. H.) refer to storage conditions maintained at a constant temperature of 113° F. and a relative humidity of 50 percent, and a constant temperature of 95° F. and a relative humidity of 50 percent, respectively.

TABLE I

SHORT CIRCUIT AT 70° F.

| Days | 1 | 15 | 35 | 55 |
|---|---|---|---|---|
| Leak-proof cell "A" | 0 | 100 | 100 | 100 |
| Fused cell | 0 | 0 | 0 | 0 |

0.6 AMPERE LAMP CONTINUOUS AT 45° C. (113° F.—50% R. H.)

| | | | | |
|---|---|---|---|---|
| Leak-proof cell "B" | 14 | 78 | 90 | 92 |
| Leak-proof cell "C" | 0 | 94 | 100 | 100 |
| Leak-proof cell "A" | 0 | 33 | 33 | 50 |
| Fused cell | 0 | 0 | 0 | 0 |

0.6 AMPERE LAMP CONTINUOUS AT 35° C. (95° F.—50% R. H.)

| | | | | |
|---|---|---|---|---|
| Leak-proof cell "B" | 8 | 50 | 56 | 56 |
| Leak-proof cell "C" | 0 | 22 | 26 | 42 |
| Leak-proof cell "A" | 0 | 84 | 84 | 84 |
| Fused cell | 0 | 0 | 0 | 0 |

0.6 AMPERE LAMP CONTINUOUS AT 70° F.

| | | | | |
|---|---|---|---|---|
| Leak-proof cell "B" | 8 | 22 | 44 | 52 |
| Leak-proof cell "C" | 0 | 42 | 80 | 84 |
| Leak-proof cell "A" | 0 | 67 | 100 | 100 |
| Fused cell | 0 | 0 | 0 | 0 |

5 OHM CONTINUOUS AT 70° F.

| | | | | |
|---|---|---|---|---|
| Leak-proof cell "A" | 0 | 0 | 0 | 0 |
| Fused cell | 0 | 0 | 0 | 0 |

2.25 OHM HEAVY INTERMITTENT FLASHLIGHT TO 0.65 V., THEN STARTED THROUGH 0.6 AMPERE LAMP

| | | | | |
|---|---|---|---|---|
| Leak-proof cell "A" | 0 | 0 | 67 | 67 |
| Fused cell | 0 | 0 | 0 | 0 |

2.25 OHM LIGHT INTERMITTENT FLASHLIGHT TO 0.65 V., THEN ON 0.6 AMPERE LAMP CONTINUOUSLY AT 70° F.

| | | | | |
|---|---|---|---|---|
| Leak-proof cell "B" | 0 | 6 | 10 | 14 |
| Leak-proof cell "C" | 0 | 0 | 2 | 4 |
| Leak-proof cell "A" | 0 | 0 | 33 | 33 |
| Fused cell | 0 | 0 | 0 | 0 |

150 MA. CONSTANT CURRENT FOR 20 HOURS, THEN ON OPEN CIRCUIT SHELF

| | | | | |
|---|---|---|---|---|
| Leak-proof cell "B" | 0 | 0 | 2 | 10 |
| Leak-proof cell "C" | 0 | 30 | 46 | 52 |
| Leak-proof cell "A" | 0 | 0 | 0 | 0 |
| Fused cell | 0 | 0 | 0 | 0 |

While the breakage of the electrolytic fuse breaks the electrical circuit of the single cell in which it is placed, an especially attractive feature of the invention is that this single fuse breakage also can open a circuit of series connected cells. Tests were arranged in which one "fused" cell was placed in series with groups of one, two and three "unfused" cells. Each group was series connected with resistance of 2.25 ohms per cell. The results given in Table II for the largest group show that the breakage of the fuse opened the circuit in all groups tested, thus preventing leakage of both "fused" and "unfused" cells. Thus the employment of only one "fused" cell per battery will furnish leak-proof batteries.

TABLE II

One "fused" cell in series with three standard cells on 2.25 ohm per cell continuous test

| Time in Hours | All Cells, Volts | "Fused" Cell, Volts | "Unfused" Cells | | |
|---|---|---|---|---|---|
| | | | Total, Volts | Individual Readings, Volts | |
| Open Circuit Voltage | | 6.50 | | | |
| Closed Circuit Voltage | 0 | 5.75 | | | |
| Readings { | 0.9 | 3.76 | | | |
| | 1.9 | 3.11 | | | |
| | 6.7 | 1.70 | | | |
| | 19.3 | 1 −0.17 | | | |
| | 21.1 | 0.025 | 2 −2.74 | | |
| | 25.5 | 0.03 | −2.96 | | |
| Days { | 3 | 0.03 | −3.17 | | |
| | 4 | 0 | −3.35 | | |
| | 5 | 0 | −3.44 | | |
| | 8 | 0.02 | −2.60 | 2.62 | 0.88 0.88 0.88 |
| | 9 | 0.02 | −2.85 | 2.87 | 0.96 0.96 3 0.96 |

¹ The drop in voltage across a load resistance of 9 ohms from 1.70 at 6.7 hours to a low value, minus 0.17 volt, at 19.3 hours, denotes that the fuse has operated and broken the circuit. At this point there was only ½ to 1 cc. of exudate in the air space of the fused cell, indicating that only a harmless quantity of exudate had developed.
² The negative reading across the fused cell indicated it acted as a high resistance, since this value was substantially equal to the reading across the three control cells but with sign reversed.
³ Standard units found to have air space only ½ full of exudate (estimated 2.5 cc.).

What is claimed is:

1. A dry cell comprising a zinc anode constituting the container thereof, a carbon electrode located therein, an ammonium chloride-wet depolarizing mix consisting of manganese dioxide surrounding said carbon cathode, and a strip of magnesium metal in series between said anode and its external terminal.

2. A dry cell according to claim 1, wherein said circuit breaking member strip is composed of aluminum.

3. A dry cell according to claim 1 wherein a low resistance directive path is provided for exudate rising from said cell mix by the combination of two waxed collars thereover, the first of these fitting the inside of the cell container and positioned directly in contact with said mix, and having a central aperture to permit the passage therethrough of said carbon electrode; said first collar having also a wide slot cut from edge to center thereof; said second collar being super-imposed over said first collar and having two apertures, one to permit passage of said carbon electrode, and the other completing the exudate path by co-extension with the slot of said first column.

4. A dry cell according to claim 1 wherein said circuit-breaking member strip is the anodic component of the system represented by the relationship.

$$MnO_2/ZnCl_2—NH_4Cl/fuse$$

5. In a dry cell containing electrolyte, the method of preventing electrolyte leakage, which method comprises providing in the circuit of such a cell a destructible metal strip between an electrode and an external terminal thereof, breaking the electrical circuit and thus terminating cell discharge.

6. A dry cell comprising a consumable metal electrode, an insoluble electrode, external terminals for said electrodes, an electrolyte-wet depolarizing mix, and a circuit-breaking member consisting of a conductive electrolyte-corrodible material, said member being in series with at least one of said electrodes, and with an external terminal thereof, said member being secured at a pre-determined position from said mix and out of contact therewith, said position being in the path of electrolyte exudate issuing from said electrolyte-wet depolarizing mix to permit contact between said member and said exudate, said member permitting customary current output from said cell under normal conditions, but breaking the cell circuit by its own destruction when contacted with electrolyte exudate issuing from said electrolyte-wet mix.

7. A dry cell according to claim 6 wherein said circuit-breaking member is in the form of a printed circuit.

8. A dry cell according to claim 6 wherein accelerator salts consisting of a mixture of aluminum sulfate and mercuric chloride are provided on top of said depolarizing mix to contact exudate rising therefrom.

9. A dry cell according to claim 6 wherein resilient means are connected with said circuit-breaking member to accelerate and facilitate rupture thereof upon contact with exudate.

10. A dry cell according to claim 6 wherein said circuit-breaking member consists of a material having a higher electro-negativity than said consumable electrode.

11. A battery consisting of a plurality of series-connected dry cells, including at least one cell in accord with claim 6.

References Cited in the file of this patent

UNITED STATES PATENTS

| | | |
|---|---|---|
| 2,653,180 | Hignett et al. | Sept. 22, 1953 |

FOREIGN PATENTS

| | | |
|---|---|---|
| 19,185 | Australia | Sept. 5, 1934 |
| 186,698 | Australia | Sept. 10, 1956 |